April 29, 1952  F. R. BONTE  2,595,121
ANTIFRICTION BEARING
Filed Jan. 2, 1947  2 SHEETS—SHEET 1
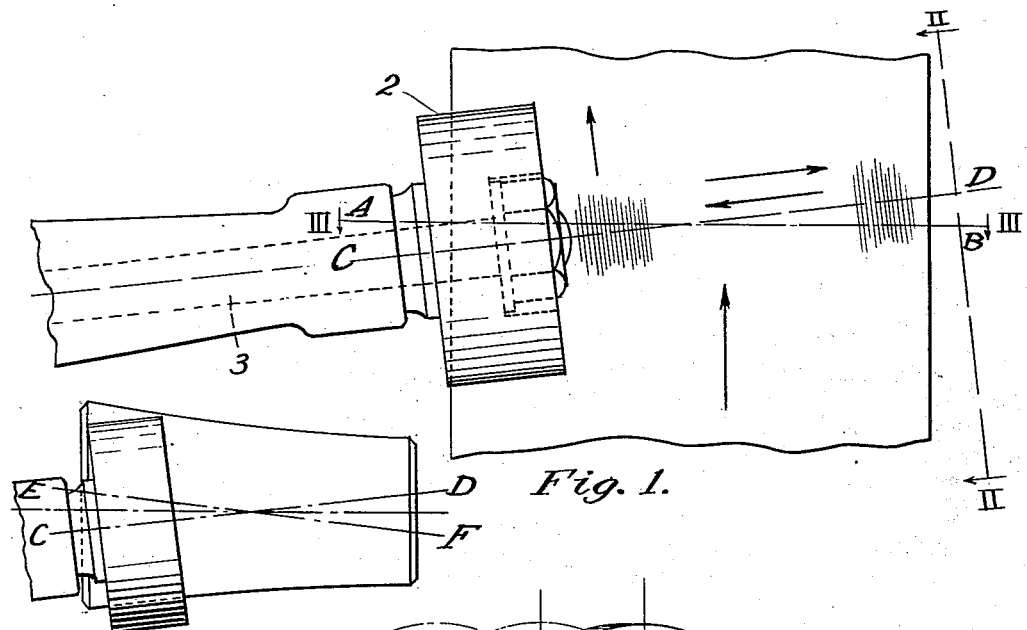
Fig. 1.
Fig. 1a.
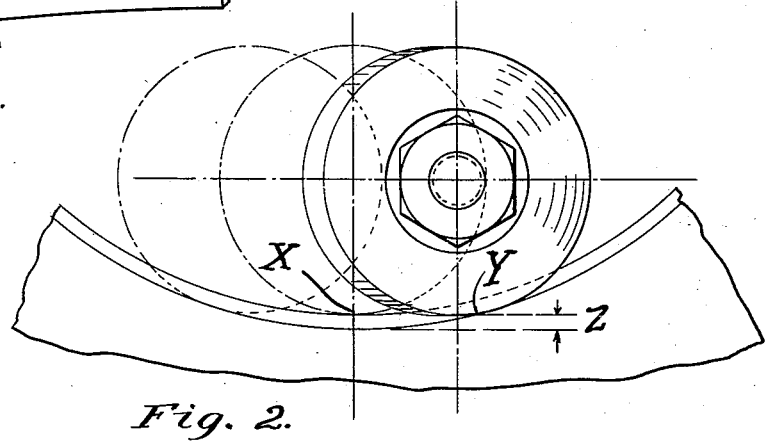
Fig. 2.
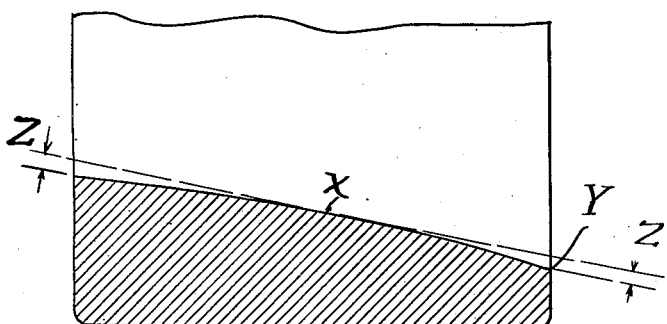
Fig. 3.
INVENTOR
Frederick R. Bonte
by his attorney
Christy, Parmelee & Strickland

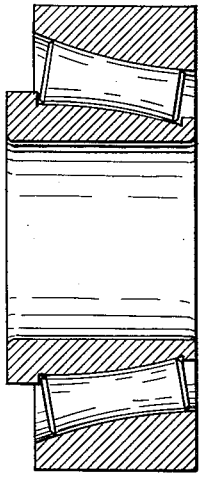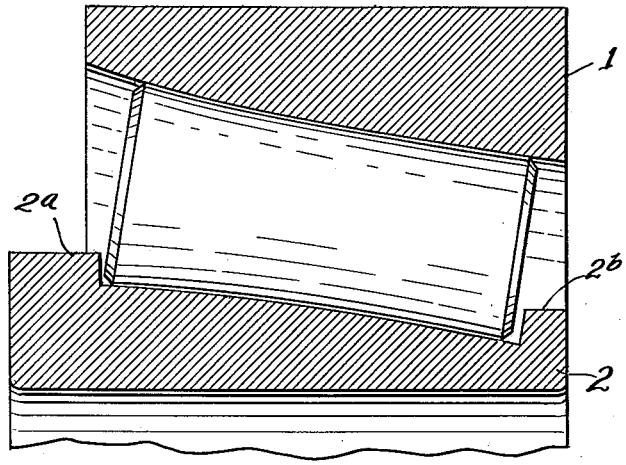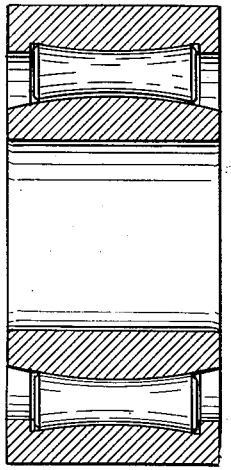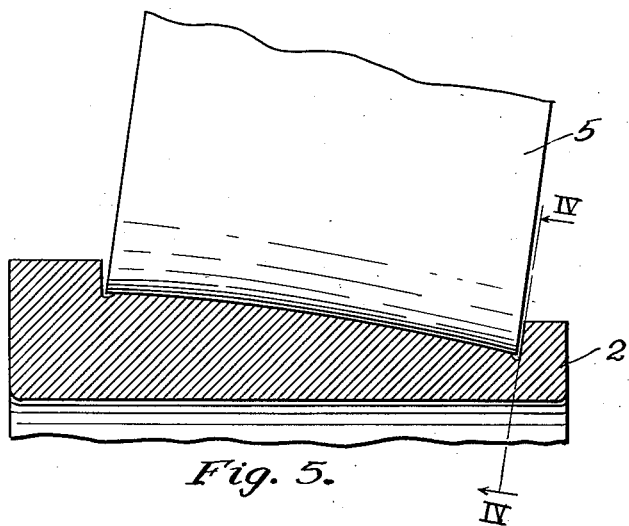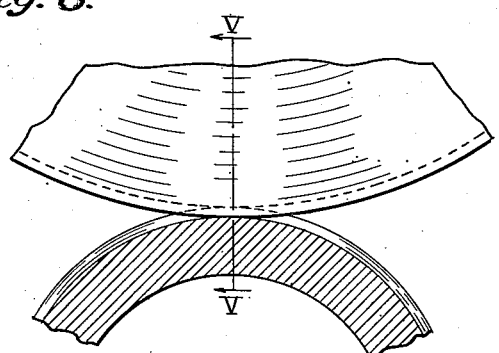

Patented Apr. 29, 1952

2,595,121

UNITED STATES PATENT OFFICE 2,595,121

ANTIFRICTION BEARING

Frederick R. Bonte, Canton, Ohio

Application January 2, 1947, Serial No. 719,815

3 Claims. (Cl. 308—214)

This invention relates to anti-friction bearings of the type using rollers, and is applicable either to straight roller bearings, conical bearings, or radial bearings.

The conventional roller bearing is constituted of at least three principal parts, these being an inner ring or cone, an outer ring or cup, and the rollers themselves which may or may not be housed in a cage. In the ordinary cone type of bearing, the rollers are a straight truncated cone, whereas in a straight roller bearing, the rollers are cylinders. The rollers, whatever their shape, have a line contact with the surface over which they are rolling. It is necessary with present designs, particularly in conical bearings, to provide guide ribs on the cone at the end of the rollers for restraining them and keeping them straight, that is, to keep them from becoming skewed. The rubbing of the ends of the roller on the rib is a source of considerable friction and constant loss of power, and not infrequently is a source of failure of the bearings.

The object of the present invention is to modify the shape of the roller whereby it tends to travel in a straight line, whereby there is less friction with the guide rib and pressures on the rib will be low as compared with present types of bearings. Additionally, the present invention provides a roller bearing design which may have greater than a line contact with the surface over which it travels without detrimentally increasing its rolling friction, so that each bearing is capable of standing a greater load than where it has only line pressure on the surfaces against which it rests.

The present invention moreover affords a modification which does not alter, except to a minor extent, present manufacturing processes, and therefore enables present methods and present equipment to be used with little or no additional expense, but with considerable improvement in the performance of the bearing.

The bearing of the present invention is based on the observation that when a straight-sided round body, such as a cylinder or a truncated cone is placed in line contact with a curved grinding surface so that the axis of the roller is at an angle to the axis of rotation of the grinding wheel, and grinding is effected while the parts are in this relation, a concavity on the surface of the roller is formed. By using a grinding wheel of appropriate width, it is possible to form between the ends of the bearing a surface of revolution which is concaved, and which has its axis at an angle to the original axis of the bearing, and which are eccentric to the intermediate portion. These end portions are of non-uniform width, tapering from a point of maximum width to a point of minimum width in both directions around the periphery of the roller, but the taper at one end is opposite to the taper at the other, so as to keep the balance of the bearing more or less uniform.

With a bearing so formed, corresponding curvature is imparted to the cone or central member about which the rollers roll, and on the cup or outer member within which the rollers travel.

Other objects and advantages of the present invention will become apparent from a study of the following specification taken with the accompanying drawings wherein:

Fig. 1 is a plan view showing a fragmentary portion of a cup of a roller bearing across the inner surface of which there is relative movement with respect to a grinding wheel in the direction of the oppositely directed arrows;

Fig. 1a is a plan view showing how relative movement between a grinding wheel and tapered roller is effected to form a concave surface on the roller;

Fig. 2 is an end view of the structure shown in Fig. 1 wherein the dash and dot lines show two other positions of the grinding wheel during its course of relative movement with respect to the surface of the cup;

Fig. 3 is a cross sectional view of the cup taken along line III—III of Fig. 1;

Fig. 4 is a fragmentary view of a grinding wheel having a concaved grinding surface for forming a convex surface on the inner race or cone;

Fig. 5 is a cross sectional view taken along line V—V of Fig. 4;

Fig. 6 is a cross sectional view of a tapered concave roller bearing involving curved surfaces made in accordance with the teachings of the present invention;

Fig. 7 is a cross sectional view of a complete roller bearing of the type shown in Fig. 6, and Fig. 8 is a cross sectional view of a modified form of roller bearing showing a barrel type of inner race or cone, but whose rollers are curved by the same principles employed in forming the rollers shown in Figs. 6 and 7.

Perhaps the most common type of roller bearing is the straight taper roller bearing consisting of an inner race or cone upon whose outer diameter is formed a working surface with a specially shaped rib against which the roller end rides, an outer race or cup whose inner diameter has a working surface which confines the rollers, and a roller separator or cage therebetween having pockets for enclosing the rollers. The cup, cone, rollers and cage all have tapered or frusto-conical working surfaces, the extensions of which surfaces converge to a common point or apex so as to provide a minimum amount of friction induced by rolling. The cage is sometimes omitted, in which case the rollers are in contact with each other, and adjacent rollers rotate in opposite directions. In order to obtain maximum efficiency of the straight taper roller bearing, the cup, cone and rollers must be accurately ground to tolerances of the order of millionths of an inch. When assembled, this type of roller bearing is extremely rigid at right angles to the roller path and therefore any deflections of the shaft or part on which it is mounted must be absorbed by increased pressure on the component parts. Considerable friction is induced by contact of the rollers with the ribs of the cone, or by full roller line contact against the pockets of the cage or against each other if no cage is used. The longitudinal contact of the roller with the cup and cone working surfaces is that of a line which varies in width depending on the load on the surface. In either convex or concave straight as well as tapered roller bearings, a self-aligning feature is incorporated, but due to the shape of the rollers and races, a frictional load of considerable proportions is produced on account of slippage between the working surfaces.

A common method of making finished roller bearings, such as tapered roller bearings, is to employ a centerless grinding machine. This machine consists of a support on which the cylindrical work rotates and travels forwardly, that is, across the face of a grinding wheel used to remove metal, and a backing-up wheel which acts as an additional support for the work and set to rotate at an angle to the work axis, therefore moving the part being ground past the working face of the grinding wheel. This backing-up wheel can have a smooth surface or a specially shaped surface to form irregular shaped cylindrical parts. The taper of the roller necessitates adjustment at present of the support, more specially, the work support blade, to produce a uniform straight taper. A common method is to insert a cup or cone in a fixture so shaped that the tapered face of the working surface is presented to the grinding wheel as a parallel line and the wheel is passed across this line until the proper size and finish are obtained. This results in a straight tapered roller bearing.

The present invention comprises a departure of the above described process and results in a concave taper roller bearing having concave rollers and convex cup and cone of corresponding curvature. The principle of the present invention may be best understood by referring to Fig. 1 which shows a fragmentary portion 1 of a cup or outer race with its inner or working surface exposed. A grinding wheel 2 having a cylindrical grinding surface is driven by a shaft 3 rotated by any suitable power source. In normal practice grinding wheel 2 is moved across the width of the cup in a direction parallel to the cup axis, that is, along line A—B of Fig. 1. Of course, the grinding wheel instead, could be held stationary and the cup moved relative thereto if desired. This provides a cylindrical inner surface for the cup in the case of a straight roller bearing or frusto-conical inner surface in the case of a taper roller bearing. In either case, the grinding wheel moves in a straight line. If, however, instead of moving the grinding wheel 2 along straight line A—B, it were, instead, moved in the direction of the line C—D, forming an angle BD with line A—B of any suitable value, such as 5°, then the grinder would remove material, particularly adjacent the sides of the cup, that is, in portions indicated by shaded lines, very little material being removed from the center portion. While the ground surface along line C—D will necessarily be a straight line since the grinding wheel 2 is moving in a straight line, the working surface of the cross sectional view taken along line A—B, however, would be convex, as shown more clearly in Fig. 3 having a high central point X and low end points Y of a distance Z apart. This convex surface is substantially an arc having a definite radius of curvature. It will be seen that the greater the angle BD, the greater the height Z or curvature of the convex surface. It will be evident that the above described method of grinding a curved surface is a very simple one since it involves a plain cylindrical grinding wheel instead of one with a specially curved surface. Inasmuch as the cup 1 has an inner surface which is convex, it will readily appear that the cone or inner race 2, (see Figs. 5 and 6), must also have a working surface which is correspondingly convex.

It will also appear that the rollers must have concave surfaces of corresponding curvature to the cup and cone.

Such concave surface may be ground on the roller by moving the grinding wheel 2 while it is rotating about its axis at the same angle BD with respect to the axis of the truncated cone roller blank. In other words, by virtue of the fact that the working surface of the cup has a curvature which is opposite to the curvature of the roller, this results in a concave curvature on the roller, as distinguished from the convex resulting curvature on the cup, but which curvatures have the same radius. Obviously, the greater the angle BD, as in the case of the cup, the greater the degree of curvature of the ground surface in the plane of Fig. 5.

Therefore, it will be seen that if the roller is placed in position between the cup and cone wherein both the cup and cone have corresponding convex surfaces, and if the line of contact between the roller and cup be designated C—D, which is a straight line, then the line of contact between the roller and cone will be diametrically opposite the roller but along line A—F. If planes were passed through lines C—D and E—F perpendicular to the plane of Fig. 1, they would intersect centrally of the roller and each plane would form the same angle BD with respect to a plane similarly passed through the axis of a roller.

The convex surface of the cone may be ground in the manner indicated in Figs. 4 and 5, that is, by using a grinding wheel 5 which has a concave grinding surface formed the same way as the concave surface on the roller and having a radius of curvature corresponding to that desired on the cone. After the convex surface is ground on the working surface of the cone, the parts are assembled and appear as shown in Figs. 6 and 7. As will be noted in these figures, cone 2 has outer ribs 2a and 2b which provide a very small contact area with the ends of the rollers. It will also be noted in these figures which show in effect a concave tapered roller bearing, that the curved surfaces provide a self-guiding or self-tracking feature which prevents endwise movement of the rollers, therefore considerably reducing friction with the ribs 2a and 2b. Also point instead of line contact will be provided with the cage (not shown) if one is used. It will also be noted that the lines of contact between the roller and cup and between the roller and cone are curved lines, instead of straight lines, therefore are of greater length than a straight line, thereby distributing the load over a greater line contact area. This makes the roller bearing capable of carrying heavier loads or of carrying the same load over a longer period of time than the well known straight tapered roller bearings.

The curvature developed by grinding the rolls and the cup in the manner described corresponds to the curve defined at the periphery of a cone bisected on a plane traversing the axis of the cone adjacent that point in the periphery where the bisecting plane crosses the plane of the axis of the cone. If a cone be bisected on a plane which is parallel with the base, the resulting section will be a circle. If it be bisected by a plane which is parallel with one side of the cone, the curve defined by the section will be a parabola. If it be bisected by a plane which is at an angle to the axis and more nearly horizontal than the sides, the section will be an ellipse, and if at an angle less than an angle parallel with the sides, the curve defined by the section will be a hyperbola. The curve in the present case may be either a portion of an ellipse, a portion of a hyperbola, or a portion of a parabola, but the mid point of the curve will always coincide with the point where the bisecting plane crosses the plane of the axis of the cone, and the curve will extend in equal directions from such mid point.

Fig. 8 shows a modification of the present invention wherein a straight roller bearing is ground substantially in the same manner as indicated above except that a cylindrical instead of a frusto-conical roller blank is used. The curved surfaces of the cup and rollers are ground by moving the grinding wheel at an angle BD to the axis of the cup or roller in accordance with the teachings illustrated in Fig. 1.

The curvature of the bearing in this case will be an ungula, which is the curve produced by bisecting a cylinder by a plane that traverses the axis of the cylinder and cuts through the sides and the base. The curve defined on the bearing will be curved in that portion of the ungula extending equidistantly from each side of the point where the bisecting plane intersects the plane of the axis of the cylinder.

With either form of the invention, the curvature is a peculiar one which may be described as the curve defined by the periphery of a body of circular section bisected on a plane which is oblique to the axis of the body, and which plane passes through the side wall and the base of the body, and is that portion of the curve which extends equidistantly each side of the point where the bisecting plane intersects the plane of the axis of the body.

Thus it will be seen that I have provided an efficient concave roller bearing embodying curved surfaces that are ground with the greatest of simplicity, therefore which roller bearing is very inexpensive to manufacture, and the curved surfaces of which provide self-tracking or self-guiding properties to the extent of making it possible to eliminate the rib on the cone, as well as considerably reducing frictional contact with the ribs of the cage, therefore minimizing power loss, also which curved surface provides a longer line of contact between the roller and cone as well as between the roller and cup, therefore considerably increasing the contact area over that provided by a straight line contact, such as in the case of a straight roller bearing or straight taper roller bearing, therefore considerably increasing the load carrying capacity or the life of the roller bearing by distributing it over a longer line contact area; furthermore, I have provided a novel and inexpensive method of making curved surfaces with an ordinary cylindrical grinding wheel by disposing the axis of rotation of the grinding wheel at an angle to the axis of the curved bearing surface, the curvature of the grinding surface being a function of said angle.

While I have illustrated and described certain specific embodiments of my invention, it will be understood that this is by way of illustration only and that various changes and modifications may be made within the contemplation of my invention and within the scope of the following claims.

I claim:

1. A roller bearing comprising a cup and cone having confronting curved surfaces and a plurality of rollers having surfaces curved to match and bear against the confronting curved surfaces of the cup and cone, the curvature of said curved surfaces of said cup, cone and rollers corresponding to a peripheral line on the surface of an elongated circular body formed by the intersection therewith of a plane passing at an acute angle through the axis of the body and the base of the body with the mid point of said peripheral line corresponding to a point on a second line in said plane which is perpendicular to the longitudinal axis of the body.

2. A concave tapered roller bearing comprising a cup and cone having frusto-conical curved confronting surfaces and a plurality of tapered rollers having correspondingly curved surfaces, the curvature of the curved surfaces of said cup, cone and rollers being the curvature defined by a line on the periphery of a conical body formed by the intersection therewith of a plane passing through the axis of the body and forming an acute angle therewith, said peripheral line having a mid point on a second line in said plane perpendicular to said axis, said peripheral line extending equidistantly in each direction from said point.

3. A roller for use in roller bearing comprising a generally frusto-conical body having a longitudinally concave periphery, the curvature of which corresponds to the curvature of a line on the periphery of a cone formed by the intersection therewith of a plane passing through the axis of the cone and forming an acute angle therewith, said peripheral line having a mid point on a second line in said plane perpendicular to said axis, said peripheral line extending equidistantly in each direction from said point.

FREDERICK R. BONTE.

REFERENCES CITED

The following references are of record in the file of this patent:

UNITED STATES PATENTS

| Number | Name | Date |
| --- | --- | --- |
| 2,089,048 | Bachman | Aug. 3, 1937 |
| 2,132,280 | Zimmerman | Oct. 4, 1938 |
| 2,187,471 | Hutchinson | Jan. 16, 1940 |
| 2,409,320 | Spicacci | Oct. 15, 1946 |
| 2,418,322 | Spicacci | Apr. 1, 1947 |